(12) United States Patent
Elahie et al.

(10) Patent No.: US 11,704,838 B1
(45) Date of Patent: Jul. 18, 2023

(54) SYSTEMS AND METHODS FOR ENCODING HYPERSPECTRAL DATA WITH VARIABLE BAND RESOLUTIONS

(71) Applicant: Illuscio, Inc., Culver City, CA (US)

(72) Inventors: Dwayne Elahie, Los Angeles, CA (US); Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/147,804

(22) Filed: Dec. 29, 2022

Related U.S. Application Data

(63) Continuation of application No. 17/816,113, filed on Jul. 29, 2022, now Pat. No. 11,544,879.

(51) Int. Cl.
  *G06K 9/36* (2006.01)
  *G06T 9/00* (2006.01)
(52) U.S. Cl.
  CPC ..................... *G06T 9/00* (2013.01)
(58) Field of Classification Search
  CPC ............ H03M 7/3046; H03M 7/3051; H03M 7/3084; H03M 7/6023; H04N 19/10; H04N 19/189; H04N 19/196; H04N 19/197; H04N 19/98; H04N 19/42; H04N 19/423; H04N 19/426; H04N 19/427; H04N 19/428; H04N 19/436; H04N 19/30; H04N 19/34; H04N 19/85; H04N 19/91; H04N 19/13; G06T 9/00; G06T 9/05; G06T 9/40; G06F 40/146
  See application file for complete search history.

(56) References Cited

U.S. PATENT DOCUMENTS

| | | | |
|---|---|---|---|
| 8,107,527 B1 | 1/2012 | Hobbs et al. | |
| 2001/0036231 A1* | 11/2001 | Easwar | G06T 9/007 375/240.03 |
| 2019/0222845 A1 | 7/2019 | Taubman et al. | |
| 2020/0349689 A1 | 11/2020 | Weng et al. | |

* cited by examiner

*Primary Examiner* — Duy M Dang
(74) *Attorney, Agent, or Firm* — Ansari Katiraei LLP; Arman Katiraei; Sadiq Ansari

(57) ABSTRACT

An encoder may perform a dynamic encoding that adapts the encoding of hyperspectral data according to the number of bands of the electromagnetic spectrum that are captured by different imaging devices, the amount of data that is contained in each band, and/or encoding criteria that are specified by a user or that are automatically generated by the encoder for an optimal encoding of the hyperspectral data. The encoder may receive hyperspectral data for different electromagnetic spectrum bands. The encoder may determine an encoding resolution based on one or more of a number of bands and a maximum resolution within the received bands. The encoder may configure a block size for a file format that is used to store an encoding of the hyperspectral data based on the encoding resolution, and may encode the hyperspectral data contained within each band to at least one block of the block size.

20 Claims, 10 Drawing Sheets

SYSTEMS AND METHODS FOR ENCODING HYPERSPECTRAL DATA WITH VARIABLE BAND RESOLUTIONS

CLAIM OF BENEFIT TO RELATED APPLICATIONS

This application is a continuation of U.S. nonprovisional application Ser. No. 17/816,113 entitled "Systems and Methods for Encoding Hyperspectral Data with Variable Band Resolutions", filed Jul. 29, 2022 and issued as U.S. Pat. No. 11,544,879. The contents of application Ser. No. 17/816,113 are hereby incorporated by reference.

BACKGROUND

Imaging cameras may be limited to capturing red, green, and blue ("RGB") bands of the electromagnetic spectrum. More specifically, imaging cameras may include sensors that measure reflectance of the visible light frequencies corresponding to the RGB colors in the electromagnetic spectrum. The imaging camera sensors may be unable to capture or measure other visible light frequencies and/or bands of the electromagnetic spectrum. Other imaging devices, such as imaging spectrometers, may be able to measure reflectance in other bands of the electromagnetic spectrum, including bands that are outside the visible light range (e.g., infrared, ultraviolet, etc.).

Different imaging devices that measure reflectance in different bands may encode the measured reflectance for the different bands in static file formats that may be incompatible with another. For instance, an imaging camera may encode the reflectance measured over the RGB bands in a static first file format that spans only the RGB bands of the electromagnetic spectrum, a first imaging spectrometer may encode the reflectance measured over a first set of infrared and ultraviolet bands in a static second file format that spans only that first set of infrared and ultraviolet bands, and a second imaging spectrometer may encode the reflectance measured over a third set of infrared and ultraviolet bands in a static third file format that spans only that first set of infrared and ultraviolet bands. Accordingly, the static file formats used by the different imaging devices may be incompatible with one another and/or may be structured or formatted differently. Consequently, a rendering, editing, and/or imaging application that is created for the static first file format may be unable to access each of the other static file formats.

Rather than use file formats that statically encode only specific bands of the electromagnetic spectrum, a static file format may be defined to encode a much larger swath of the electromagnetic spectrum. For instance, the static file format may be defined to encode frequencies or bands in the X-ray, ultraviolet, visible light, infrared, and microwave ranges of the electromagnetic spectrum. Each band in each of the covered electromagnetic spectrum frequencies may be encoded with the same number of bits or bytes. Such file formats may be significantly larger in size than the static file formats encoding specific bands, and a large amount of the file may contain filler data or zero values for the bands that are not measured or captured by the different imaging devices. For instance, 10 megabytes of data may be used to encode 1000 different bands spanning different infrared, visible light, and ultraviolet frequencies of the electromagnetic spectrum. An imaging camera may take an image, obtain data for the RGB bands, and may encode 3 of the 1000 different bands with relevant data. The other 997 bands of the file format may be encoded with null or 0 values, thereby resulting in a large file in which most of the data is filler or padded values.

DETAILED DESCRIPTION OF PREFERRED EMBODIMENTS

The following detailed description refers to the accompanying drawings. The same reference numbers in different drawings may identify the same or similar elements.

Provided are systems and methods for encoding hyperspectral data with variable band resolutions. The systems and methods may include a hyperspectral encoder that implements the variable band resolution encoding of hyperspectral data.

In some embodiments, the hyperspectral encoder may perform a dynamic encoding that adapts according to different bands of the electromagnetic spectrum that are captured by different imaging devices. In some such embodiments, the hyperspectral encoder may change the bands that are encoded in a particular file format to match the different frequency ranges of the electromagnetic spectrum that are captured by different imaging devices. In other words, the hyperspectral encoder may encode different bands and/or different numbers of bands to the same particular file format.

In some embodiments, the hyperspectral encoder may perform a variable band encoding that may change the resolution for each of the encoded bands. For instance, a first high frequency band may be encoded with more data than a second low frequency band when the first high frequency band includes more data than the second low frequency band, when lossless encoding is selected for the first high frequency band and lossy encoding is selected for the second low frequency band, and/or when the hyperspectral encoder detects other variations in the bands that may lead to a more efficient encoding of the captured or inputted bands.

Accordingly, the hyperspectral encoder may produce a dynamic file format that does not statically encode the same set of bands with the same amount of data for different imaging devices that measure reflectance over different bands of the electromagnetic spectrum. Moreover, the hyperspectral encoding may produce the dynamic file format without statically encoding the same amount of data for bands that have no data or bands where the measured reflectance has large variation. More resolution or bits may be used to encode the bands containing the relevant and/or varying hyperspectral data, and less resolution or bits may be used to encode the bands that contain irrelevant hyperspectral data, no data, and/or hyperspectral data with minimal variation from one band to another.

In some embodiments, the hyperspectral encoder may perform the dynamic encoding to produce a file format of a desired size or resolution. In some such embodiments, bands containing too much data may be condensed and bands containing too little data may be padded so that each band is represented with the desired size or resolution.

Figure 1:
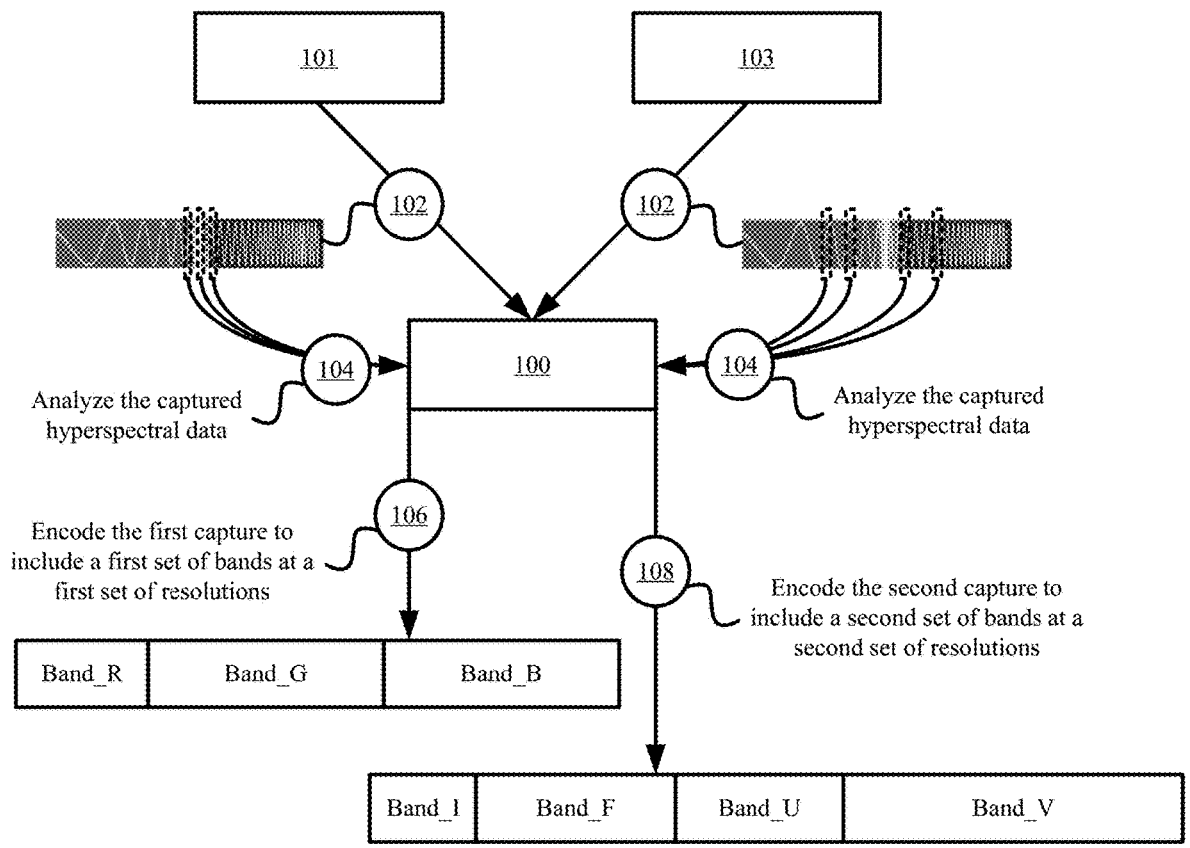
FIG. 1 illustrates an example of variable band resolution encoding in accordance with some embodiments presented herein.

FIG. 1 illustrates an example of the variable band resolution encoding performed by hyperspectral encoder 100 in accordance with some embodiments presented herein. Hyperspectral encoder 100 may receive (at 102) first and second captures from different imaging devices 101 and 103. For instance, imaging device 101 may correspond to an imaging camera that measures reflectance across a first set of bands (e.g., the RGB bands), and imaging device 103 may correspond to an imaging spectrometer that measures reflectance across a different second set of bands (e.g., different infrared and ultraviolet bands). The first set of bands may correspond to different frequencies of the electromagnetic spectrum as well as a different number of bands than the second set of bands. In some embodiments, hyperspectral encoder 100 may receive the hyperspectral data from a computer-generated image, point cloud, or file that defines pixels, data points, meshes, and/or image primitives or constructs with hyperspectral data.

Hyperspectral encoder 100 may analyze (at 104) the data within each of the first and second captures. Analyzing (at 104) the data may include identifying the bands that are captured by each imaging device 101 and 103 and/or which bands contain important or relevant data that should be represented at a higher first resolution, and which bands contain data that can be discarded or represented at a lower second resolution.

Hyperspectral encoder 100 may dynamically encode (at 106) the first capture by generating a first file that spans a first set of bands and by encoding the first set of bands at different resolutions (e.g., with different amounts of data). Hyperspectral encoder 100 may dynamically encode (at 108) the second capture by generating a second file that spans a second set of bands and by encoding the second set of bands at different resolutions than the resolutions used to encode the first capture.

Figure 2:
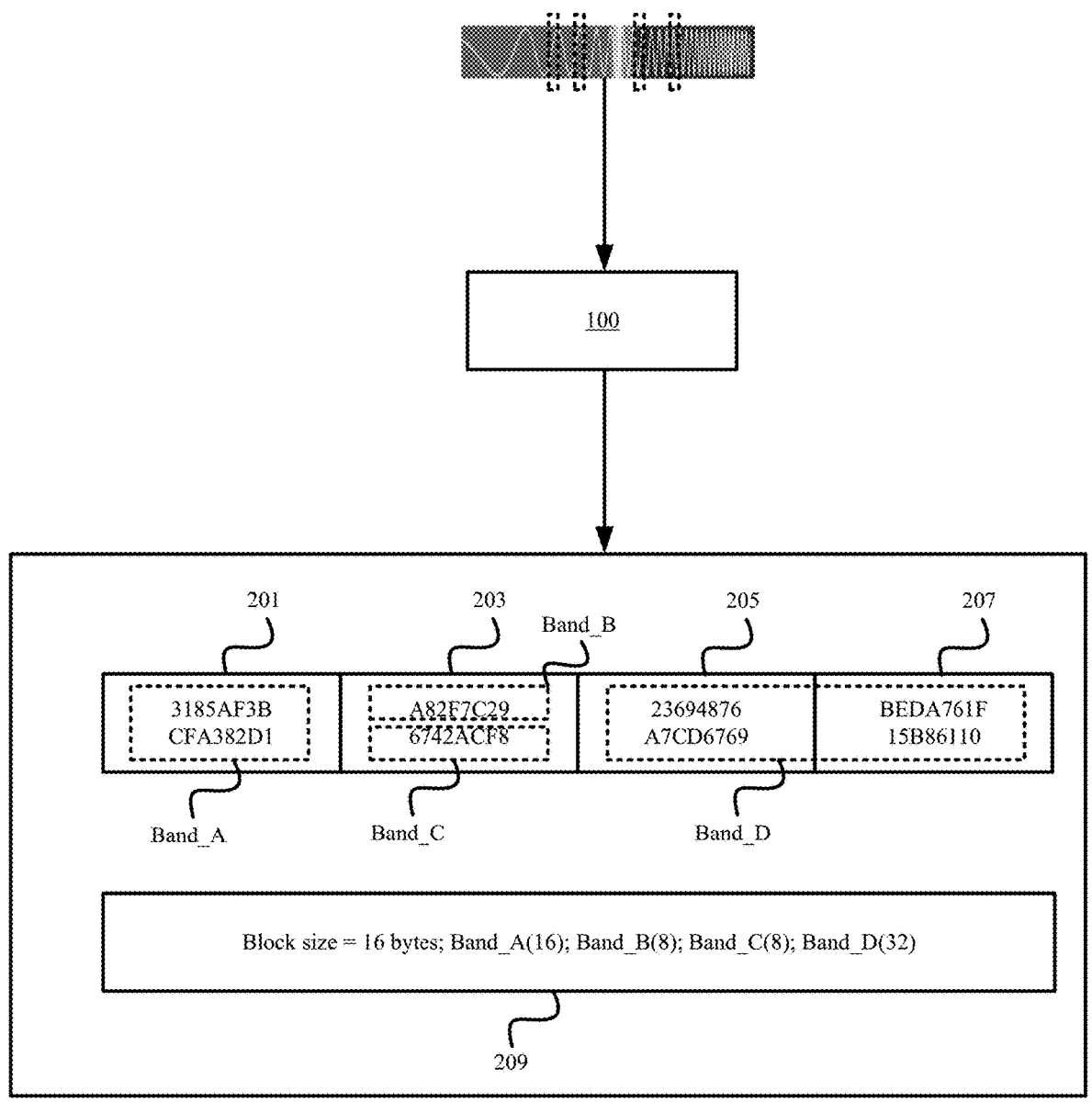
FIG. 2 illustrates an example formatting for the variable band resolution encoded file in accordance with some embodiments presented herein.

FIG. 2 illustrates an example formatting for the variable band resolution encoded file in accordance with some embodiments presented herein. As shown in FIG. 2, the encoded file may include equal sized blocks. For instance, each block may be defined with 16 bytes of data.

However, each block may contain the hyperspectral data for a different number of bands. For instance, first block 201 may use all 16 bytes of data to encode the hyperspectral data of a first band, wherein as second block 203 may use 8 bytes of data to encode the hyperspectral data of a second band and the other 8 bytes of data to encode the hyperspectral data of a third band. Moreover, hyperspectral encoder 100 may encode the hyperspectral data of a fourth band across the 16 bytes of data of third block 205 and fourth block 207. Accordingly, the variable band encoding performed by hyperspectral encoder 100 may include encoding the first band with 16 bytes of data, the second band with 8 bytes of data, the third band with 8 bytes of data, and the fourth band with 32 bytes of data.

The encoded file may include metadata 209 that defines the size of each block, the one or more bands represented by each block of the encoded file, and/or the size of each encoded band. Accordingly, the variable band resolution encoded file may be adapted based on metadata 209 to encode different bands of spectrum that are captured by different devices, and/or to encode each band with a different resolution (e.g., a different number of bytes).

In some embodiments, metadata 209 may specify an index for each block of the encoded file. Each index may be associated with one or more band identifiers. In some embodiments, each band identifier may specify the frequency range of the electromagnetic spectrum covered by that band. In some other embodiments, each band identifier may include a single value that corresponds to a defined frequency range of the electromagnetic spectrum. For instance, a band identifier of "70 nm" may directly map to the 70 nm frequency or a frequency range between 70 nm and 75 nm.

Figure 3:
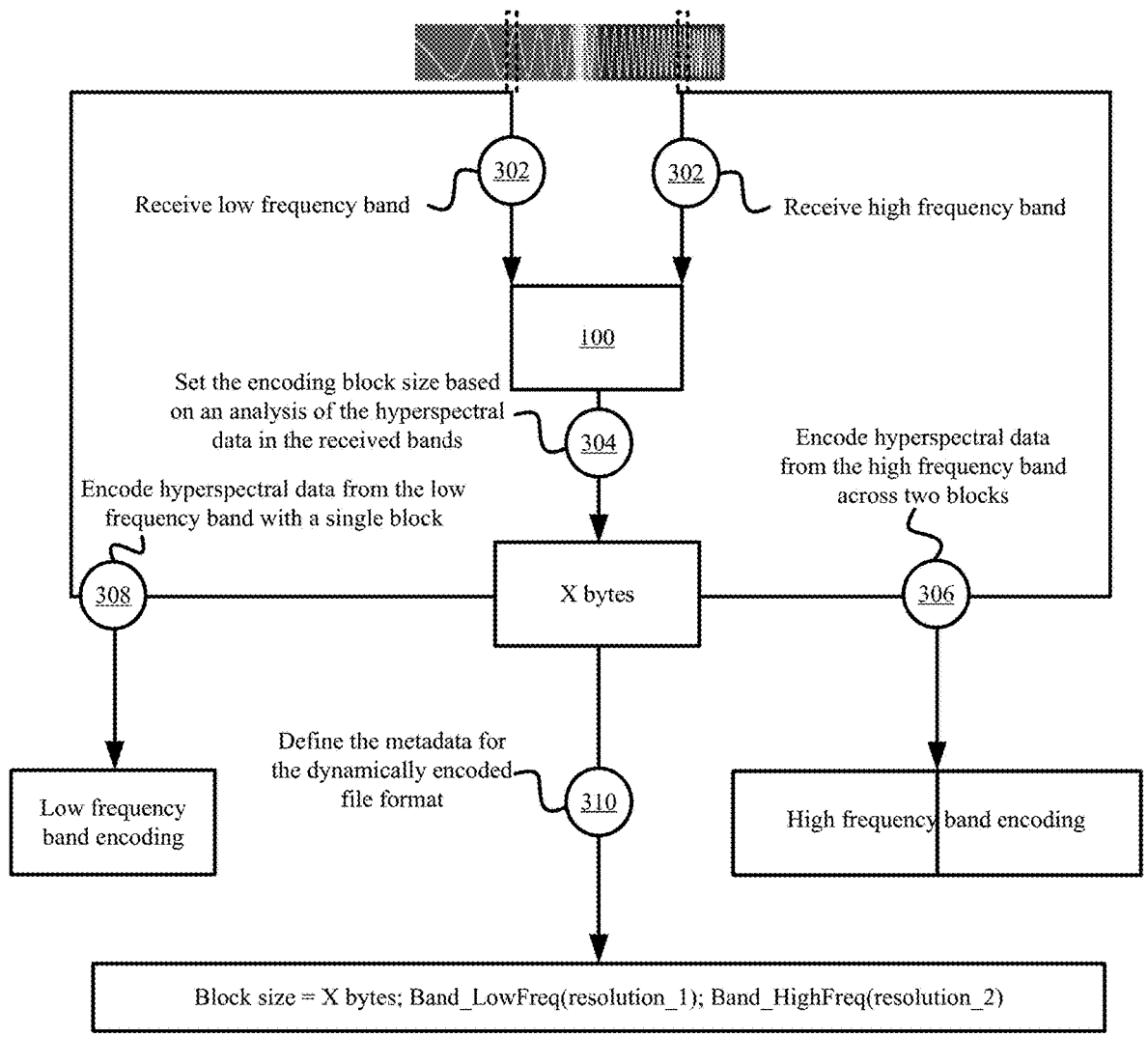
FIG. 3 illustrates an example of encoding different bands with variable band resolutions in accordance with some embodiments presented herein.

FIG. 3 illustrates an example of encoding different bands with variable band resolutions in accordance with some embodiments presented herein. Hyperspectral encoder 100 may receive (at 302) a measurement and/or capture of a high frequency first band and a low frequency second band.

Hyperspectral encoder 100 may analyze the bands in order to determine the number of bits or bytes to encode each band. Based on the analysis, hyperspectral encoder 100 may select and/or set (at 304) the block size for optimally encoding the received hyperspectral data. In some embodiments, hyperspectral encoder 100 may set (at 304) the block size to minimize the amount of padding or filler data that is added to the encoding, provide a lossless encoding of the hyperspectral data (e.g., a maximum resolution encoding), encode the hyperspectral data with a specified or acceptable amount of compression or resolution loss, and/or encode the hyperspectral data to fit within a specified file size. Accordingly, hyperspectral encoder 100 may analyze the bands according to encoding criteria, and may select (at 304) a block size for the encoding that satisfies the encoding criteria. In this manner, hyperspectral encoder 100 dynamically changes the encoding for different hyperspectral data and dynamically changes the file format used to store the encoding.

Hyperspectral encoder 100 may represent and/or encode (at 306) the high frequency first band with more data than the low frequency second band because of the higher frequency containing higher amplitudes or peaks and/or covering a larger range of values than the low frequency second band. Accordingly, hyperspectral encoder 100 may encode (at 306) the high frequency first band using all the bits or bytes of two consecutive blocks from the encoded file format, and may encode (at 308) the low frequency second band with all the bits or bytes of a single block from the encoded file format.

Hyperspectral encoder 100 may define (at 310) metadata for the dynamically encoded file format. The metadata may specify the block size, the encoding of different bands to different blocks (e.g., by mapping band identifiers to different block indices), the resolution at which the different bands are encoded, and/or another mapping of the hyperspectral data from the different bands to the different blocks (e.g., the number of bits or bytes used to encode each of the different bands).

Hyperspectral encoder 100 may provide the encoded file with the metadata to a device, application, or service that is configured to process the encoded file format based on the defined metadata. For instance, an image rendering or editing application may decode the encoded hyperspectral data from the file based on the formatting specified in the metadata, and may generate an image or visualization based on the decoded hyperspectral data.

In some embodiments, hyperspectral encoder 100 may simplify the encoding by encoding a single band within each block of the encoded file. In some such embodiments, some bands that have a lower resolution than the maximum resolution that may be encoded to an individual block may be padded, and some bands that have a higher resolution than the maximum resolution may be compressed, truncated, or encoded at a lower resolution.

Figure 4:
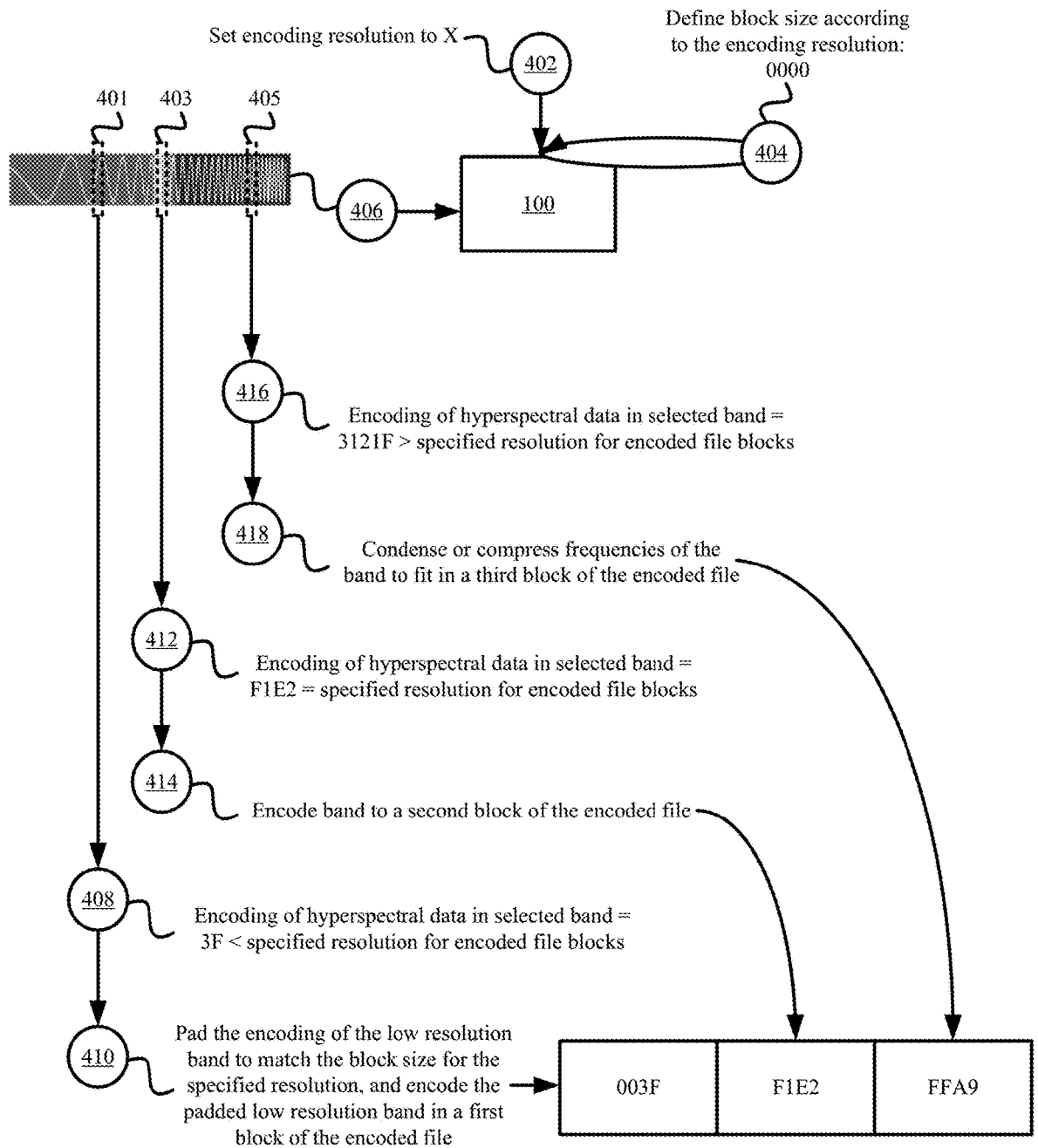
FIG. 4 illustrates an example of adapting the variable band resolution encoding according to a specified resolution in accordance with some embodiments presented herein.

FIG. 4 illustrates an example of adapting the variable band resolution encoding according to a specified resolution in accordance with some embodiments presented herein. Hyperspectral encoder 100 may receive (at 402) input that specifies a desired resolution for the encoding. In some embodiments, the desired resolution may be defined as a number of bits or bytes at which to encode each separate band or each frequency range within the electromagnetic spectrum (e.g., 5 nanometers segments within the electromagnetic spectrum). In some embodiments, the desired resolution may be specified as an amount of compression or acceptable loss. In some embodiments, the desired resolution may be specified as a desired file size for encoding any number of bands or hyperspectral data.

Hyperspectral encoder 100 may define (at 404) a block size for the file format according to the specified resolution. For instance, hyperspectral encoder 100 may determine the maximum number of bits or bytes required to encode bands at the specified resolution, and/or the number of bits or bytes required to span a range defined by the specified resolution.

Hyperspectral encoder 100 may receive (at 406) hyperspectral data that contains different amounts of data for three bands 401, 403, and 405. For instance, bands 401, 403, and 405 may span different frequencies of the electromagnetic spectrum, and each band 401, 403, and 405 may different amplitudes and/or variation.

Hyperspectral encoder 100 may determine (at 408) that the frequencies within first band 401 may be encoded using less data than the specified resolution. In other words, first band 401 may be defined at a lower resolution than the specified resolution that may be encoded to a single block of the encoded file. Accordingly, hyperspectral encoder 100 may encode (at 410) first band 401 by padding the data within first band 401 to match a block size for the specified resolution.

Hyperspectral encoder 100 may determine (at 412) that second band 403 is defined at the specified resolution. Accordingly, hyperspectral encoder 100 may encode (at 414) the hyperspectral data from second band 403 to a second block of the encoded file.

Hyperspectral encoder 100 may determine (at 416) that third band 405 is defined at a resolution that is greater than the specified resolution. Accordingly, hyperspectral encoder 100 may encode (at 418) third band 405 to a third block of the encoded file by condensing the data used to represent third band 405. For instance, hyperspectral encoder 100 may cut or remove the highest and lowest end frequencies of third band 405, or may perform a lossy compression to represent third band 405 at a lower resolution that matches the specified resolution.

In some embodiments, the different resolution encoding or block sizes may adapt the encoded file to run on devices with different resources and/or performance. For instance, the encoded file may be run on an edge compute device that provides users low latency access to desired data. Hyperspectral encoder 100 may determine the maximum resolution supported by the edge compute device or the resolution that the edge compute device is able to process without lag or delay, and may set the specified resolution of the encoded file to conform to the performance envelope of the edge compute device. In other words, hyperspectral encoder 100 may lower the resolution at which the hyperspectral data in different bands is encoded so that there is less data for the edge compute device to decode when processing or generating visualizations from the encoded hyperspectral data. Conversely, hyperspectral encoder 100 may perform a lossless encoding of the bands when the target device has ample resources or requires a full resolution encoding of the hyperspectral data. To perform the lossless encoding of the bands, hyperspectral encoder 100 may analyze the received hyperspectral data to determine the one or more bands that contain the most data and/or that the maximum resolution within the hyperspectral data, and may set the encoding resolution and/or file format block size to match that maximum resolution.

Figure 5:
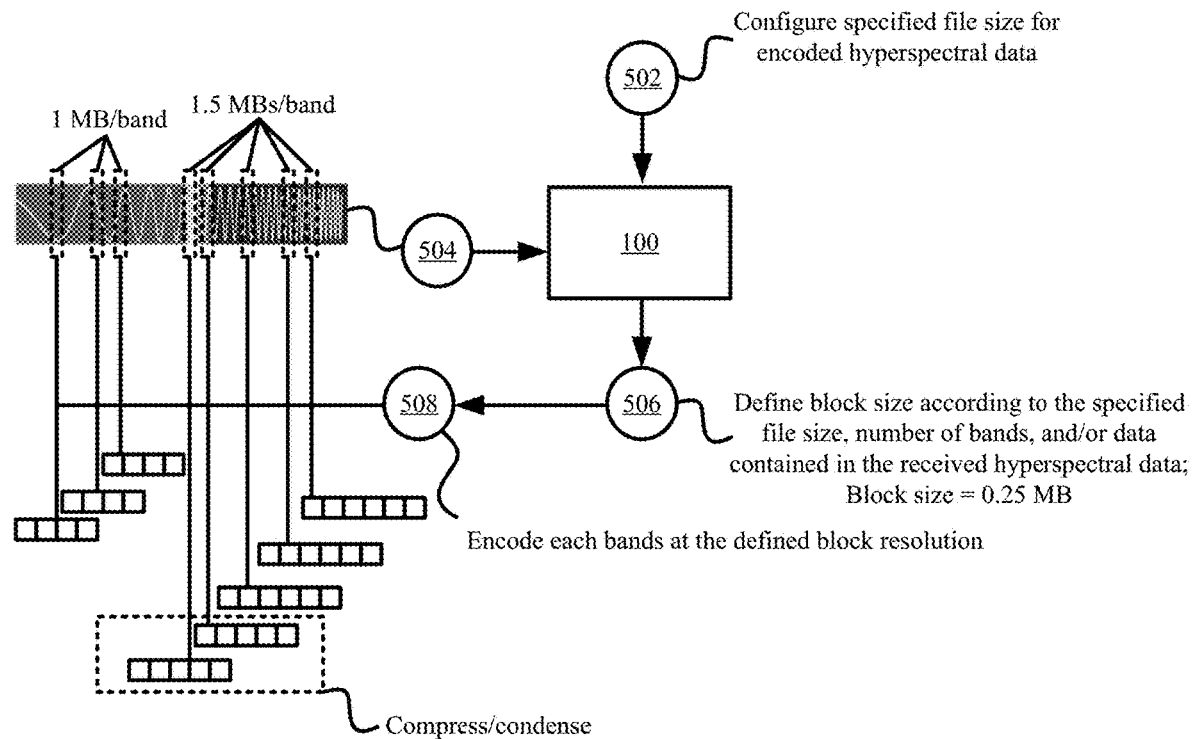
FIG. 5 illustrates an example of adapting the variable band resolution encoding according to a specified file size in accordance with some embodiments presented herein.

FIG. 5 illustrates an example of adapting the variable band resolution encoding according to a specified file size in accordance with some embodiments presented herein. Hyperspectral encoder 100 may be configured (at 502) with the specified file size. The specified file size may be a maximum supported size for the encoded file used to represent an image and/or a point cloud.

Hyperspectral encoder 100 may receive (at 504) hyperspectral data that spans several bands (e.g., a capture from a hyperspectral imaging device). Hyperspectral encoder 100 may analyze the hyperspectral data to determine the number of bands and/or the size of each band (e.g., the frequencies and/or the amount of data contained in each band), and may define (at 506) the blocks of the encoded file according to the specified file size, the number of bands that are to be encoded, and/or the amount of data within each band. Defining (at 506) the blocks may include setting the encoding resolution to produce an encoded representation of the hyperspectral data that is no greater than the specified file size and that minimizes the amount of loss or compression when encoding the bands of the hyperspectral data. For example, if the specified file size is 10 MBs and the hyperspectral data includes 5 bands with 1.5 MBs of data and 3 bands with 1 MBs of data for a total of 8 bands and 10.5 MBs of data, then hyperspectral encoder 100 may define 1.25 MB blocks and encode each band with 1.25 MBs of data. In this example, 0.75 MB of the encoding would be padded or filler data since each of the 1 MB bands is encoded in separate 1.25 MB blocks, and 1.25 MBs of data would be lost as each of the 1.5 MBs bands is condensed and encoded in separate 1.25 MB blocks. To improve the loss and thereby optimize the overall encoding, hyperspectral encoder 100 may define the block size to be 0.25 MBs so that there is no loss in encoding any of the 1 MB bands as each band may be encoded across 4 blocks, and only 0.5 MBs is lost across the 1.5 MB bands. Accordingly, hyperspectral encoder 100 may optimize encoding resolution by considering the specified file size, whether the encoding should be lossless or lossy, and/or the maximum amount of data needed to represent a band.

Hyperspectral encoder 100 may encode (at 508) each of the bands in the hyperspectral data at the defined block resolution. In some embodiments, hyperspectral encoder 100 may select which bands to compress or condense based on the frequencies or data included in the bands. For instance, hyperspectral encoder 100 may select and compress bands in the visible light range over bands in the ultraviolet range because of the higher frequencies and/or greater data loss that may occur when compressing or condensing the ultraviolet bands.

Figure 6:
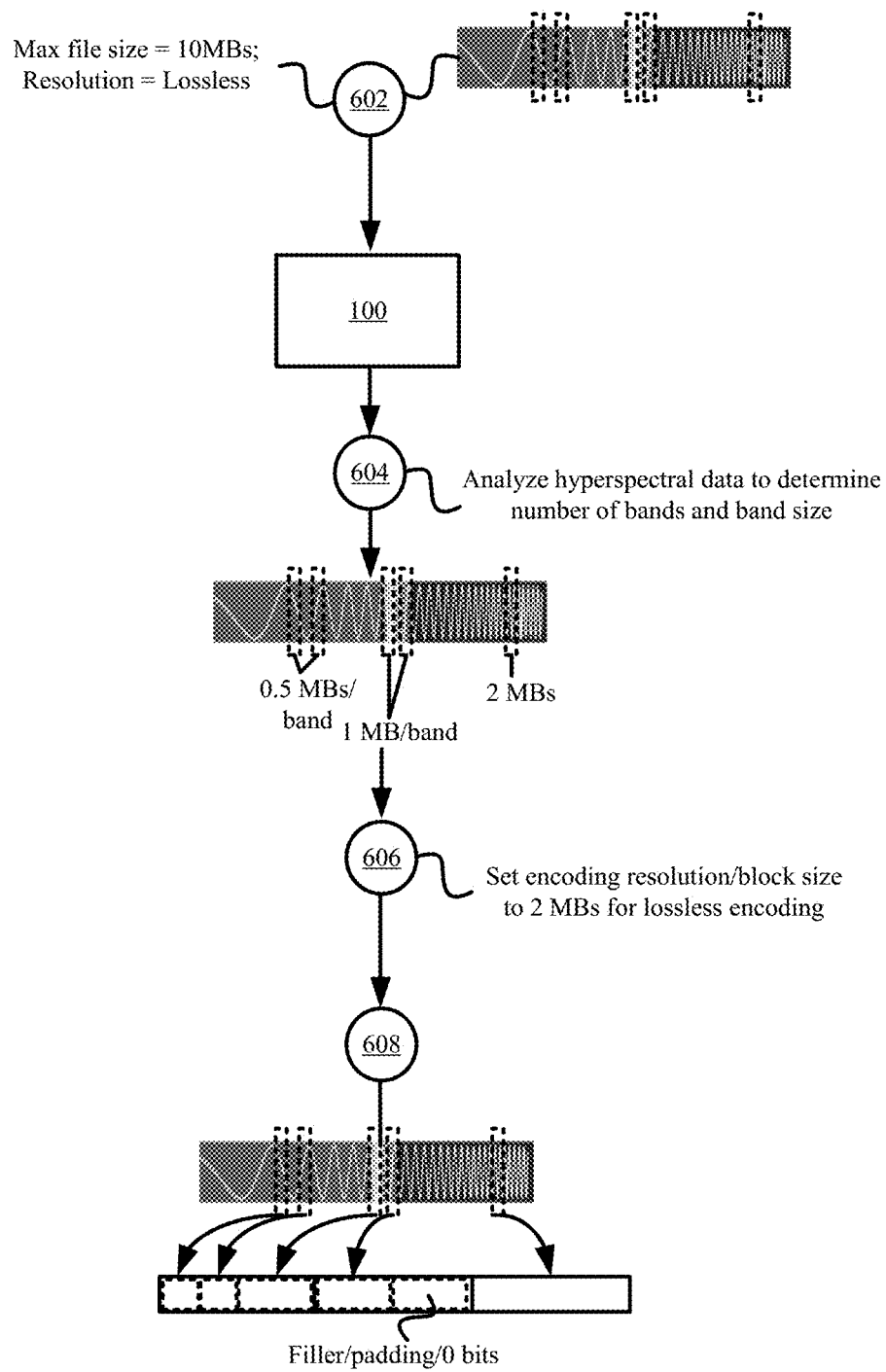
FIG. 6 illustrates an example of adapting the variable band resolution encoding according to a specified file size, amount of compression, and maximum amount of data associated with the encoded bands in accordance with some embodiments presented herein.

Hyperspectral encoder 100 may further optimize the encoding by selecting an optimal resolution and/or block size based on the received hyperspectral data and other inputs, and by encoding two or more bands in a single block. FIG. 6 illustrates an example of adapting the variable band resolution encoding according to a specified file size, amount of compression, and maximum amount of data associated with the encoded bands in accordance with some embodiments presented herein.

Hyperspectral encoder 100 may receive (at 602) the hyperspectral data that is subject to the encoding and input that sets the encoded file size to 10 MBs and the desired amount of compression to be lossless. Hyperspectral encoder 100 may analyze (at 604) the hyperspectral data to determine that the hyperspectral data contains 5 bands that are 0.5 MBs, 1 MB, 2 MBs, 1 MB, and 0.5 MBs in size.

To satisfy the lossless encoding requirement, hyperspectral encoder 100 may set (at 606) the encoding block size to 2 MB. Hyperspectral encoder 100 may encode (at 608) the first 0.5 MB band, the second 1 MB band, and the fifth 0.5 MB band to a first block of the encoded file, may encode the second 1 MB band to a second block of the encoded file, may pad the second block with an additional 1 MB of irrelevant or zero data, and may encode the third 2 MB band to a third block of the encoded file. Consequently, the encoded file may be a total of 6 MBs and may contain 5 MBs of relevant hyperspectral data and 1 MB of filler data. Hyperspectral encoder 100 may store the encoded file or may provide the encoded file to another device, application, and/or service for processing, editing, or image rendering.

Figure 7:
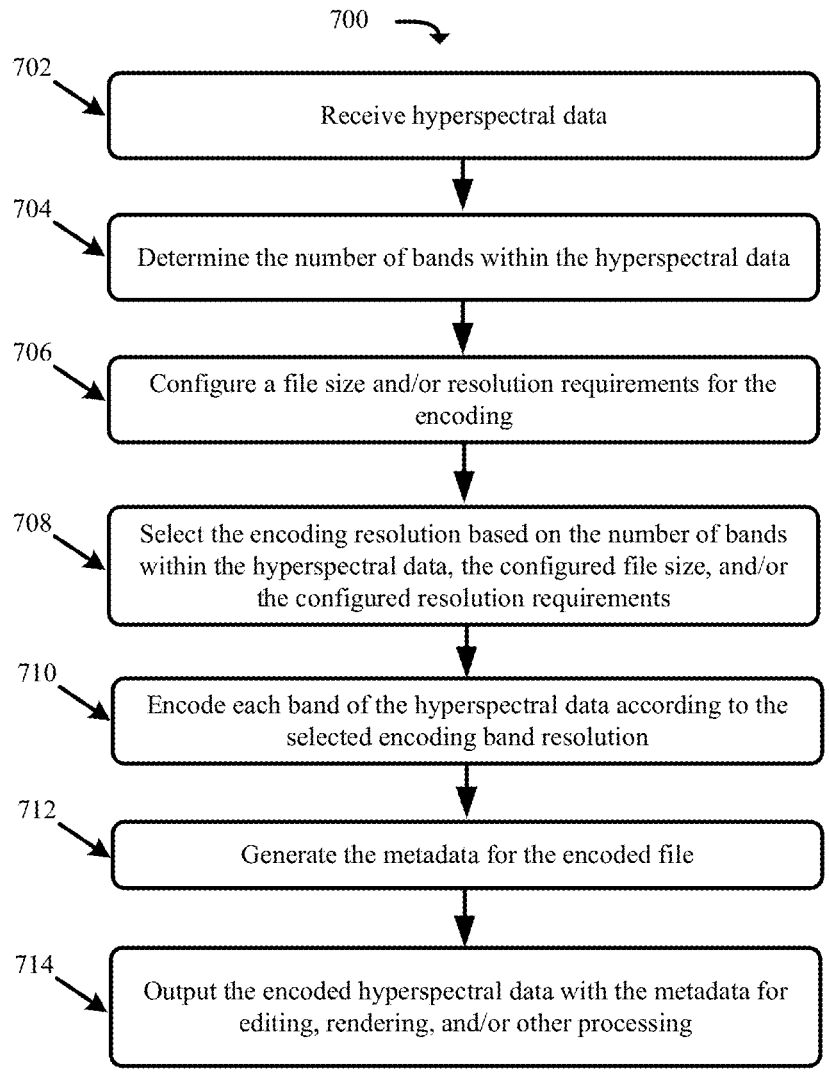
FIG. 7 presents a process for performing the variable band resolution encoding in accordance with some embodiments presented herein.

FIG. 7 presents a process 700 for performing the variable band resolution encoding in accordance with some embodiments presented herein. Process 700 may be implemented by hyperspectral encoder 100. In some embodiments, hyperspectral encoder 100 may be a device or machine with one or more hardware processors for encoding hyperspectral data with the variable band resolution. In some embodiments, hyperspectral encoder 100 may be part of a hyperspectral acquisition, rendering, editing, and/or processing system.

Process 700 may include receiving (at 702) hyperspectral data. The hyperspectral data may be generated by an imaging device or may include computer-generated imagery or graphics. The hyperspectral data may include measurements taken at several different bands of the electromagnetic spectrum. A band may correspond to a specific frequency or a consecutive range of frequencies in the electromagnetic spectrum. The measurements may include an amount of light energy at the different bands or frequencies that is reflected back to the imaging device.

Process 700 may include determining (at 704) the number of bands within the hyperspectral data. In some embodiments, hyperspectral encoder 100 may query the particular imaging device or may obtain a configuration of the particular imaging device in order to determine (at 704) the number of bands that the particular imaging device is configured to measure. In some other embodiments, hyperspectral encoder 100 may analyze the hyperspectral data to determine the electromagnetic frequencies contained within the hyperspectral data, and may quantize the electromagnetic frequencies to one or more bands. In some such embodiments, hyperspectral encoder 100 may detect the frequencies at which there is some measured data or non-zero data.

Process 700 may include configuring (at 706) file size and/or resolution requirements for the encoding. The file size and/or resolution requirements may be specified by a user, or may be automatically determined by hyperspectral encoder 100 based on the resources at a destination that is to receive the encoding. The file size requirement may specify a maximum file size allowed for the encoded file. The resolution requirements may specify a maximum or minimum resolution for representing each of the bands. In some embodiments, the resolution requirements may be defined based on a desired amount of compression. For instance, a lossless compression may involve setting the resolution requirement to match the maximum resolution of the bands within the hyperspectral data. Hyperspectral encoder 100 may implement lossy compression in different ways. For instance, a resolution requirement specifying a 10% compression may involve reducing the resolution of each band by 10% in some embodiments. In some other embodiments, the 10% compression may involve setting the maximum resolution of the bands to be 90% of the resolution for the band in the hyperspectral data that has the greatest resolution.

Process 700 may include selecting (at 708) the encoding resolution based on the number of bands within the hyperspectral data, the configured file size, and/or the configured resolution requirements. The encoding resolution may specify the maximum number of bits or bytes that may be used to represent each band of the hyperspectral data.

Process 700 may include encoding (at 710) each band of the hyperspectral data according to the selected encoding band resolution. In some embodiments, hyperspectral encoder 100 may encode (at 710) each band to a different block. In some such embodiments, hyperspectral encoder 100 may shrink, compress, or condense a band that has a greater resolution than the selected encoding resolution, and may pad a band that has a lower resolution than the selected encoding resolution so that all bands may be represented in different blocks of the encoding. In some other embodiments, hyperspectral encoder 100 may optimize the encoding (at 710) by encoding lower resolution bands together in a single block if the block size is sufficient to accommodate two or more lower resolution bands with the configured resolution requirements.

Process 700 may include generating (at 712) the metadata for the encoded file. Generating (at 710) the metadata may include assigning a unique index to each band in the hyperspectral data, specifying the selected encoded resolution (e.g., the size of each block within the encoding), and/or linking one or more of the band indices to different blocks of the encoding (e.g., mapping the band indices to block identifiers).

Process 700 may include outputting (at 714) the encoded hyperspectral data with the metadata (e.g., the encoded file) for editing, rendering, and/or other processing. In some embodiments, hyperspectral encoder 100 may be part of a system that edits, renders, and/or processes the encoded hyperspectral data. In some other embodiments, hyperspectral encoder 100 may provide the encoded file to another device, application, and/or service that performs the editing, rendering, and/or processing.

In some embodiments, the encoded hyperspectral data may be for a single pixel within an image, a single data point within a point cloud, and/or a single object or feature within a multi-dimensional environment or space (e.g., a two-dimensional ("2D") space or a three-dimensional ("3D") environment). Accordingly, the encoded file may contain encoded hyperspectral data for different pixels, point cloud data points, and/or other objects or features within the multi-dimensional environment or space. In some other embodiments, the encoded hyperspectral data may be for a set of pixels, point cloud data points, and/or objects or features. For instance, the encoded hyperspectral data may define the hyperspectral properties and/or characteristics for a set of point cloud data points that have the same hyperspectral properties and/or characteristics.

The encoded hyperspectral data may also provide a file format that is easily and quickly processed by a Graphics Processing Unit ("GPU") or other processor. Specifically, the uniform block sizes within the encoded file format allow the GPU to parse the blocks of the uniform size and render the data within each block regardless of whether a block contains the hyperspectral data for one or more bands.

Figure 8:
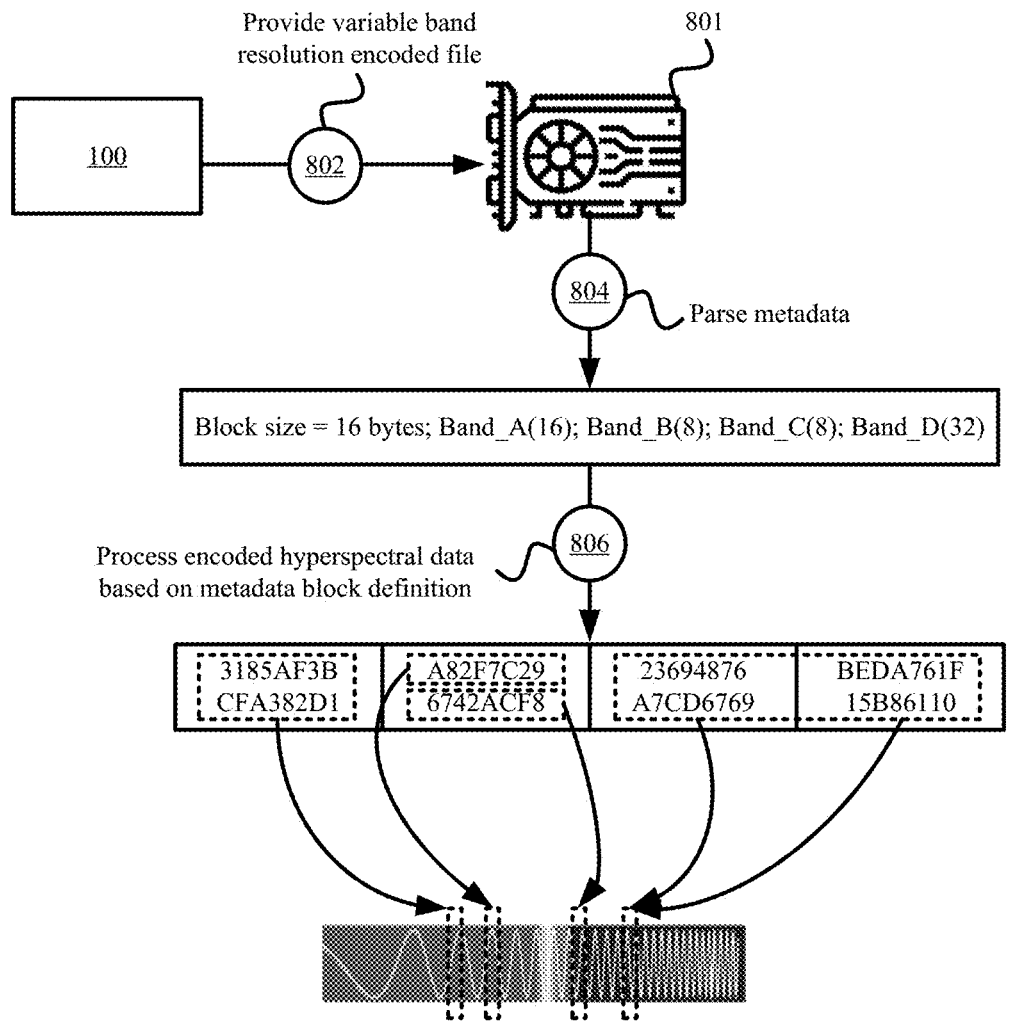
FIG. 8 illustrates an example of processing the encoded hyperspectral data in accordance with some embodiments presented herein.

FIG. 8 illustrates an example of processing the encoded hyperspectral data in accordance with some embodiments presented herein. As shown in FIG. 8, the variable band resolution encoded hyperspectral data may be provided (at 802) to GPU 801 for processing. For instance, GPU 801 may be tasked with rendering a hyperspectral visualization from the data points of a point cloud.

GPU 801 may parse (at 804) the metadata included with the encoded hyperspectral data to determine the block size used to encode the bands and the number of bands in each block. GPU 801 may process (at 806) the encoded hyperspectral data based on the metadata block definition and/or variable band encoding specified in the metadata. Processing (at 806) the encoded hyperspectral data may include identify an encoded block of hyperspectral data, determining the number of bands encoded within the block, decoding the block to obtain the hyperspectral data that is associated with each band encoded to the block, and/or rendering the decoded hyperspectral data associated with each band to generate a visualization.

The encoding of the hyperspectral data may produce a spectral signature for the pixel, data point, object, and/or feature that is associated with that hyperspectral data. The spectral signature may be used to identify the material property associated with that pixel, data point, object, and/or feature. The material property may then be used to enhance the rendering, processing, editing, and/or other interactions with the pixel, data point, object, and/or feature. For instance, hyperspectral encoder 100 and/or a rendering system may use the spectral signature and/or derived material property to determine how light will react at the pixel, data point, object, and/or feature having that spectral signature.

Figure 9:
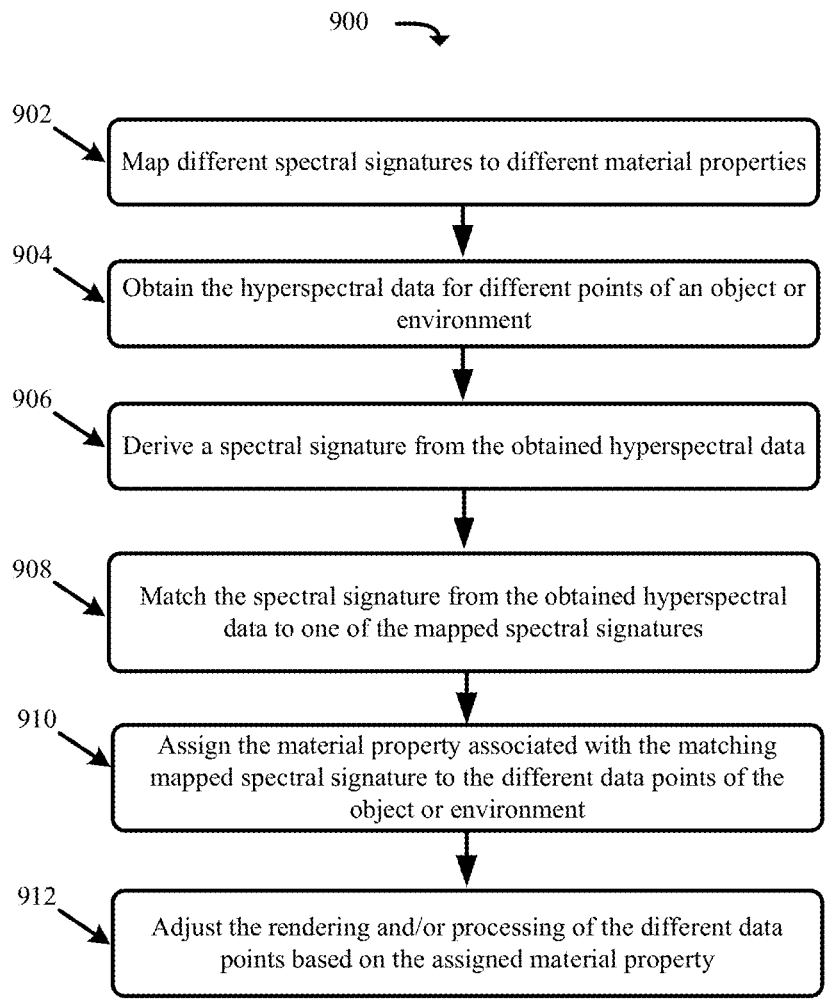
FIG. 9 presents a process for processing the hyperspectral data in accordance with some embodiments presented herein.

FIG. 9 presents a process 900 for processing the hyperspectral data in accordance with some embodiments presented herein. Process 900 may be implemented by hyperspectral encoder 100 and/or a system that integrates or operates in conjunction with hyperspectral encoder 100.

Process 900 may include mapping (at 902) different spectral signatures to different material properties. For instance, different objects with different material properties may be scanned across multiple bands or frequencies of the electromagnetic spectrum (e.g., two or more infrared bands, two or more visible light bands, two or more ultraviolet bands, etc.) in order to obtain the hyperspectral data that represents the spectral signature of each material property. The spectral signature may correspond to the unique combination of reflectance that is measured across multiple bands of the electromagnetic spectrum for each different material. For instance, a specific plastic may have a first reflectance for a first infrared band, a second reflectance for a second infrared band, and a third reflectance for a first ultraviolet band, and a specific metal may have a fourth reflectance for the first infrared band, the second reflectance for the second infrared band, and a fifth reflectance for the first ultraviolet band.

In some embodiments, the spectral signature may be derived from the hyperspectral data that is obtained from different points or features of a common object or environment. In some embodiments, the spectral signature may be derived from the hyperspectral data of a single data point or feature of an object or environment.

A user may manually label the spectral signature of a particular material property with an identifier for the particular material property. For instance, the spectral signature of plastic will differ from the spectral signature of steel, and the spectral signature of steel will differ from the spectral signature of iron. Accordingly, hyperspectral encoder 100 may be configured with a mapping table that maps between the different spectral signatures and the different material properties.

Process 900 may include obtaining (at 904) the hyperspectral data for different points of an object or environment. In some embodiments, the hyperspectral data may be obtained (at 904) from scanning the object or environment with an imaging spectrometer or other scanner. In some embodiments, the hyperspectral data may be obtained (at 904) as part of an image file that was computer-generated or generated by a scanner. In some embodiments, the obtained hyperspectral data may include the same bands or frequencies of the electromagnetic spectrum used to map the spectral signatures to the material properties. In some other embodiments, the obtained hyperspectral data may include fewer or different bands or frequencies than those used to map the spectral signatures to the material properties.

Process 900 may include deriving (at 906) a spectral signature from the obtained (at 904) hyperspectral data. In some embodiments, deriving (at 906) the spectral signature may include aggregating different measurements obtained for the same or different bands across different points or surfaces of the scanned object or environment. For instance, the spectral signature may include a first measurement for a first band that is obtained from scanning a first point or feature of the object, and a second measurement for a different second band that is obtained from scanning a second point or feature of the object.

Process 900 may include matching (at 908) the spectral signature from the obtained (at 904) hyperspectral data to one of the mapped spectral signatures. In some embodiments, the spectral signature of the obtained (at 904) hyperspectral data may be an exact match for one of the mapped spectral signatures, or may match one of the mapped spectral signatures by a threshold amount.

Process 900 may include assigning (at 910) the material property associated with the matching mapped spectral signature to the different data points of the object or environment associated with the obtained hyperspectral data. Process 900 may include adjusting (at 912) the rendering and/or processing of the different data points based on the assigned (at 910) material property. For instance, the material property may be defined to have a specific amount of reflectivity, transparency, thickness, smoothness, density, and/or other characteristics that may cause the different data points to react differently in response to light, applied forces (e.g., push, pull, etc.), and/or other inputs. In other words, the affect that light, applied forces, and/or other inputs have on the different data points may be adjusted (at 912) based on the assigned (at 910) material property.

Figure 10:
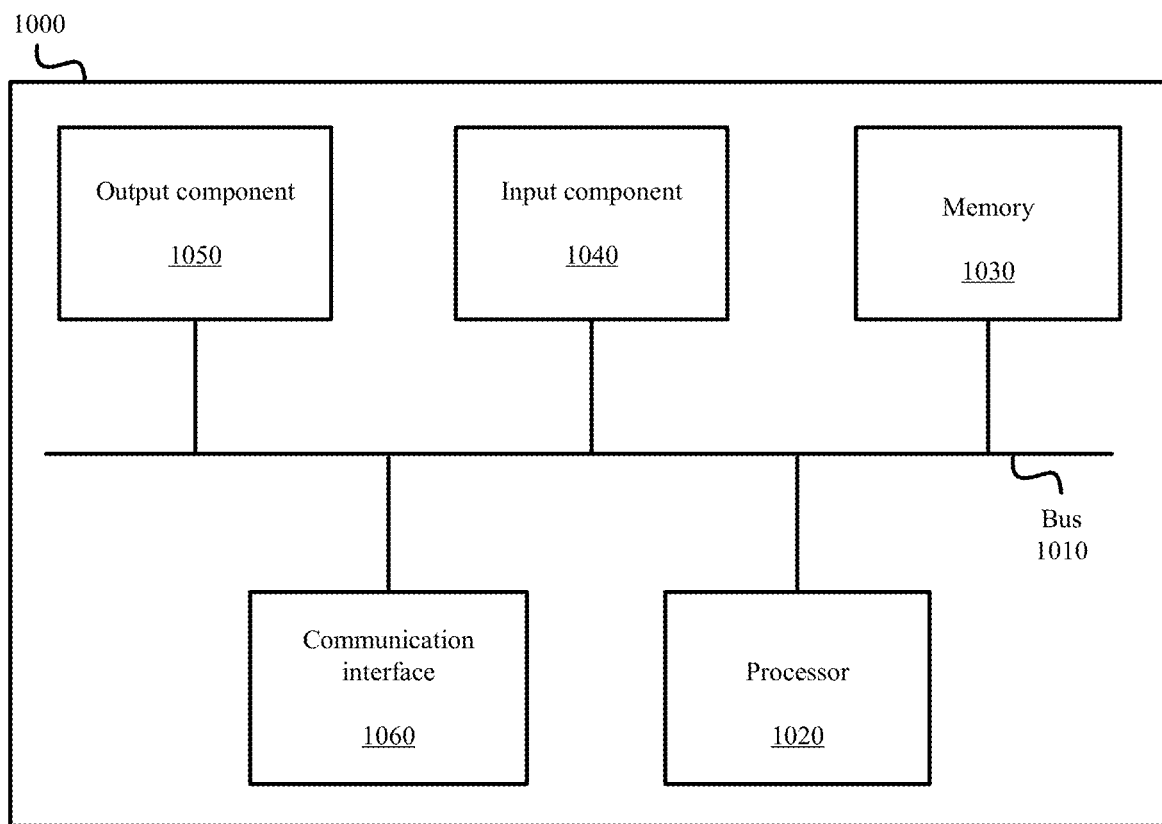
FIG. 10 illustrates example components of one or more devices, according to one or more embodiments described herein.

FIG. 10 is a diagram of example components of device 1000. Device 1000 may be used to implement one or more of the devices or systems described above (e.g., hyperspectral encoder 100, rendering system, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving image data for a plurality of bands of the electromagnetic spectrum;
   encoding a first band of the plurality of bands with a first number of bits;
   encoding a second band of the plurality of bands with a second number of bits that is different than the first number of bits;
   generating a file with the first band encoded in the first number of bits and the second band encoded in the second number of bits; and
   defining metadata for the file, the metadata comprising a first identifier for locating the first band in the file, and a second identifier for locating the second band in the file.

2. The method of claim 1 further comprising:
   associating the first identifier to a location of a first block having a first size equal to the first number of bits; and
   associating the second identifier to a location of a second block having a second size equal to the second number of bits.

3. The method of claim 1 further comprising:
   defining the first identifier as a first index corresponding to an index of a first block of the file storing the first number of bits; and
   defining the second identifier as a second index corresponding to an index of at least a second block of the file storing the second number of bits.

4. The method of claim 1 further comprising:
   defining the first identifier with a first value equal to the first number of bits; and
   defining the second identifier with a second value equal to the second number of bits.

5. The method of claim 1 further comprising:
   defining the first identifier as a first number of blocks from the file that store the first number of bits; and
   defining the second identifier as a second number of blocks from the file that store the second number of bits.

6. The method of claim 1 further comprising:
   defining the first identifier with a first frequency of the electromagnetic spectrum spanned by the first band; and
   defining the second identifier with a second frequency of the electromagnetic spectrum spanned by the second band.

7. The method of claim 1 further comprising:
   defining the first identifier based on a first resolution at which the first band is encoded; and
   defining the second identifier based on a second resolution at which the second band is encoded.

8. The method of claim 1 further comprising:
   mapping the first identifier to a first block of a plurality of blocks from the file storing the first number of bits; and
   mapping the second identifier to at least a second block of the plurality of blocks from the file storing the second number of bits.

9. The method of claim 1, wherein generating the file comprises:
   defining a constant block size for the file;
   storing the first number of bits in a first block of the constant block size; and
   storing the second number of bits in a second block and a third block of the constant block size.

10. The method of claim 9, wherein
    the metadata further comprises the constant block size for the first block and the second block.

11. The method of claim 9, wherein
    the first identifier identifies the first block storing the first number of bits, and the second identifier identifies the second block and the third block storing the second number of bits.

12. The method of claim 1, wherein generating the file comprises:
    defining a variable block size for the file;
    storing the first number of bits in a first block of a first size corresponding to the first number of bits; and
    storing the second number of bits in a second block of a second size corresponding to the second number of bits.

13. The method of claim 1, wherein generating the file comprises:
    storing the first number of bits in a first block of a constant size equal to the first number of bits;
    storing the second number of bits in a second block of the constant size; and
    padding the second block with additional bits based on a difference between the constant size and the second number of bits.

14. The method of claim 1, wherein generating the file comprises:
    storing the first number of bits in a first block and a second block that are each a same size, and wherein the same size of one of the first block or the second block is less than the first number of bits; and
    storing the second number of bits in a third block of the same size that is equal to or greater than the second number of bits.

15. The method of claim 1, wherein the first band corresponds to a visible light band of the electromagnetic spectrum, and wherein the second band corresponds to an infrared or ultraviolet band of the electromagnetic spectrum.

16. An encoder comprising:
    one or more hardware processors configured to:
    receive image data for a plurality of bands of the electromagnetic spectrum;
    encode a first band of the plurality of bands with a first number of bits;
    encode a second band of the plurality of bands with a second number of bits that is different than the first number of bits;
    generate a file with the first band encoded in the first number of bits and the second band encoded in the second number of bits; and
    define metadata for the file, the metadata comprising a first identifier for locating the first band in the file, and a second identifier for locating the second band in the file.

17. A method comprising:
receiving image data for a plurality of bands of the electromagnetic spectrum;
encoding a first band of the plurality of bands with a first number of bits;
encoding a second band of the plurality of bands with a second number of bits that is different than the first number of bits; and
generating a file with the first band encoded in the first number of bits and the second band encoded in the second number of bits, wherein generating the file comprises:
defining a constant block size for the file;
storing the first number of bits in a first block of the constant block size; and
storing the second number of bits in a second block and a third block of the constant block size.

18. An encoder comprising:
one or more hardware processors configured to:
receive image data for a plurality of bands of the electromagnetic spectrum;
encode a first band of the plurality of bands with a first number of bits;
encode a second band of the plurality of bands with a second number of bits that is different than the first number of bits; and
generate a file with the first band encoded in the first number of bits and the second band encoded in the second number of bits, wherein generating the file comprises:
defining a constant block size for the file;
storing the first number of bits in a first block of the constant block size; and
storing the second number of bits in a second block and a third block of the constant block size.

19. A method comprising:
receiving image data for a plurality of bands of the electromagnetic spectrum;
encoding a first band of the plurality of bands with a first number of bits;
encoding a second band of the plurality of bands with a second number of bits that is different than the first number of bits; and
generating a file with the first band encoded in the first number of bits and the second band encoded in the second number of bits, wherein generating the file comprises:
defining a variable block size for the file;
storing the first number of bits in a first block of a first size corresponding to the first number of bits; and
storing the second number of bits in a second block of a second size corresponding to the second number of bits.

20. An encoder comprising:
one or more hardware processors configured to:
receive image data for a plurality of bands of the electromagnetic spectrum;
encode a first band of the plurality of bands with a first number of bits;
encode a second band of the plurality of bands with a second number of bits that is different than the first number of bits; and
generate a file with the first band encoded in the first number of bits and the second band encoded in the second number of bits, wherein generating the file comprises:
defining a variable block size for the file;
storing the first number of bits in a first block of a first size corresponding to the first number of bits; and
storing the second number of bits in a second block of a second size corresponding to the second number of bits.

\* \* \* \* \*